(12) United States Patent
King et al.

(10) Patent No.: US 9,406,938 B2
(45) Date of Patent: Aug. 2, 2016

(54) THREE-DIMENSIONAL (3D) POROUS ELECTRODE ARCHITECTURE FOR A MICROBATTERY

(75) Inventors: William P. King, Champaign, IL (US); Paul V. Braun, Savoy, IL (US); James H. Pikul, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 84 days.

(21) Appl. No.: 14/235,338

(22) PCT Filed: Jul. 25, 2012

(86) PCT No.: PCT/US2012/048057
§ 371 (c)(1),
(2), (4) Date: Jan. 27, 2014

(87) PCT Pub. No.: WO2013/019489
PCT Pub. Date: Feb. 7, 2013

(65) Prior Publication Data
US 2014/0147747 A1    May 29, 2014

Related U.S. Application Data

(60) Provisional application No. 61/513,178, filed on Jul. 29, 2011.

(51) Int. Cl.
*H01M 4/78* (2006.01)
*H01M 4/40* (2006.01)
(Continued)

(52) U.S. Cl.
CPC .............. *H01M 4/78* (2013.01); *H01M 4/0404* (2013.01); *H01M 4/08* (2013.01); *H01M 6/40* (2013.01)

(58) Field of Classification Search
CPC ....... H01M 4/78; H01M 4/08; H01M 4/0404; H01M 4/0452; H01M 4/66; H01M 4/32; H01M 4/505; H01M 4/131
See application file for complete search history.

(56) References Cited

U.S. PATENT DOCUMENTS 4,737,889 A * 4/1988 Nishino ................... D04H 1/42
162/138
2008/0246580 A1    10/2008 Braun et al.
(Continued)

OTHER PUBLICATIONS

Ahn, Jong-Hyun et al., "Heterogeneous Three-Dimensional Electronics by Use of Printed Semiconductor Nanomaterials," *Science*, 314 (2006) pp. 1754-1757.
(Continued)

*Primary Examiner* — Kenneth Douyette
(74) *Attorney, Agent, or Firm* — Brinks Gilson & Lione

(57) ABSTRACT

A three-dimensional porous electrode architecture for a microbattery includes a substrate having first and second conductive patterns disposed thereon where the first and second conductive patterns are electrically isolated from each other, a three-dimensional porous cathode disposed on the first conductive pattern, and a three-dimensional porous anode disposed on the second conductive pattern. The porous cathode includes a first conductive scaffold conformally coated with a layer of a cathode active material and having a porosity defined by a network of interconnected pores, where the first conductive scaffold has a lateral size and shape defined by the first conductive pattern and porous side walls oriented substantially perpendicular to the substrate. The porous anode includes a second conductive scaffold conformally coated with a layer of an anode active material and having a porosity defined by a network of interconnected pores.

20 Claims, 13 Drawing Sheets

(51) Int. Cl.
*H01M 4/04* (2006.01)
*H01M 4/08* (2006.01)
*H01M 6/40* (2006.01)

(56) References Cited

U.S. PATENT DOCUMENTS

| | | | |
|---|---|---|---|
| 2009/0011316 | A1 | 1/2009 | Tuller et al. |
| 2009/0202899 | A1* | 8/2009 | Pyszczek ............. H01M 6/06 429/152 |
| 2010/0065889 | A1 | 3/2010 | Braun et al. |
| 2010/0068623 | A1 | 3/2010 | Braun et al. |
| 2011/0045346 | A1 | 2/2011 | Chiang et al. |

OTHER PUBLICATIONS

Aricò, Antonino Salvatore et al., "Nanostructured materials for advanced energy conversion and storage devices," *Nature Materials*, 4 (2005) pp. 366-377.
Arthur, Timothy S. et al., "Three-dimensional electrodes and battery architectures," *MRS Bulletin*, 36 (2011) pp. 523-531.
Beck, Fritz et al., "Rechargeable batteries with aqueous electrolytes," *Electrochimica Acta*, 45 (2000) pp. 2467-2482.
Bruce, Peter G. et al., "Nanomaterials for Rechargeable Lithium Batteries," *Angew. Chem. Int. Ed.*, 47 (2008) pp. 2930-2946.
Burke, Andrew, "Ultracapacitor technologies and application in hybrid and electric vehicles," *Int. J. Energy Res.*, 34 (2010) pp. 133-151.
Chamran, Fardad et al., "Fabrication of High-Aspect-Ratio Electrode Arrays for Three-Dimensional Microbatteries," *Journal of Microelectromechanical Systems*, 16, 4 (2007) pp. 844-852.
Chen, Y. C. et al., "Holographically fabricated photonic crystals with large reflectance," *Applied Physics Letters*, 91 (2007) pp. 241103-1-241103-3.
Deiss, E. et al., "Modeling of the charge-discharge dynamics of lithium manganese oxide electrodes for lithium-ion batteries," *Electrochimica Acta*, 46 (2001) pp. 4185-4196.
Del Campo, A. et al., "SU-8: a photoresist for high-aspect-ratio and 3D submicron lithography," *J. Micromech. Microeng.*, 17 (2007) pp. R81-R95.
Doyle, Marc et al., "Comparison of Modeling Predictions with Experimental Data from Plastic Lithium Ion Cells," *J. Electrochem. Soc.*, 143, 6 (1996) pp. 1890-1903.
Hosono, Eiji et al., "High-Rate Lithium Ion Batteries with Flat Plateau Based on Self-Nanoporous Structure of Tin Electrode," *Journal of the Electrochemical Society*, 154, 2 (2007) pp. A146-A149.
Kang, Byoungwoo et al., "Battery materials for ultrafast charging and discharging," *Nature*, 458 (2009) pp. 190-193.
Long, Jeffrey W. et al., "Three-Dimensional Battery Architectures," *Chem. Rev.* 104, 10 (2004) pp. 4463-4492.
Lorenz, H. et al., "High-aspect-ratio, ultrathick, negative-tone near-UV photoresist and its applications for MEMS," *Sensors and Actuators*, A 64 (1998) pp. 33-39.
Min, Hong-Seok et al., "Fabrication and properties of a carbon/polypyrrole three-dimensional microbattery," *Journal of Power Sources*, 178 (2008) pp. 795-800.
Miyake, Masao et al., "Fabrication of Three-Dimensional Photonic Crystals Using Multibeam Interference Lithography and Electrodeposition," *Advanced Materials*, 21 (2009) pp. 3012-3015.
Nathan, Menachem et al., Three-Dimensional Thin-Film Li-Ion Microbatteries for Autonomous MEMS, *Journal of Microelectromechanical Systems*, 14, 5 (2005) pp. 879-885.
Park, Junyong et al., "Three-dimensional nanonetworks for giant stretchability in dielectrics and conductors," *Nature Communications*, 3 (2012) pp. 1-8.
Peterman, Mark C. et al., "Building thick photoresist structures from the bottom up," *J. Micromech. Microeng.*, 13 (2003) pp. 380-382.
Pinson, Matthew B. et al., "Theory of SEI Formation in Rechargeable Batteries: Capacity Fade, Accelerated Aging and Lifetime Prediction," *Journal of the Electrochemical Society*, 160, 2 (2013) pp. A243-A250.
Souquet, Jean Louis et al., "Thin film lithium batteries," *Solid State Ionics*, 148 (2002) pp. 375-379.
Stolwijk, N. A. et al., "Mass and charge transport in the PEO-NaI polymer electrolyte system: effects of temperature and salt concentration," *Faraday Discussions*, 134 (2007) pp. 157-169.
Verma, Pallavi et al., "A review of the features and analyses of the solid electrolyte interphase in Li-ion batteries," *Electrochimica Acta*, 55 (2010) pp. 6332-6341.
Wang, Chia-Wei et al., "Mesoscale Modeling of a Li-Ion Polymer Cell," *Journal of the Electrochemical Society*, 154, 11 (2007) pp. A1035-A1047.
Xu, Kang, "Nonaqueous Liquid Electrolytes for Lithium-Based Rechargeable Batteries," *Chemical Reviews*, 104, 10 (2004) pp. 4303-4417.
Zadin, Vahur et al., "Modelling electrode material utilization in the trench model 3D-microbattery by finite element analysis," *Journal of Power Sources*, 195 (2010) pp. 6218-6224.
Zhang, Huigang et al., "Three-dimensional bicontinuous ultrafast-charge and -discharge bulk battery electrodes," *Nature Nanotechnology*, 6 (2011) pp. 277-281.
International Search Report for International Application No. PCT/US2012/048057, mailing date Oct. 1, 2012, pp. 1-4.
Kotobuki, M., et al., "Effect of Sol Composition on Solid Electrode/Solid Electrolyte Interface for All-Solid State Lithium Ion Battery," *Electrochim. Acta*, 56 (2011) pp. 1023-1029.
Notten, P.H.L., et al., "3-D Integrated All-Solid-State Rechargeable Batteries," *Advanced Materials*, 19 (2007) pp. 4564-4567.
Braun, P.V., et al., "High Power Rechargeable Batteries," *Current Opinion in Solid State and Materials Science*, 16 (2012), pp. 186-198.

\* cited by examiner

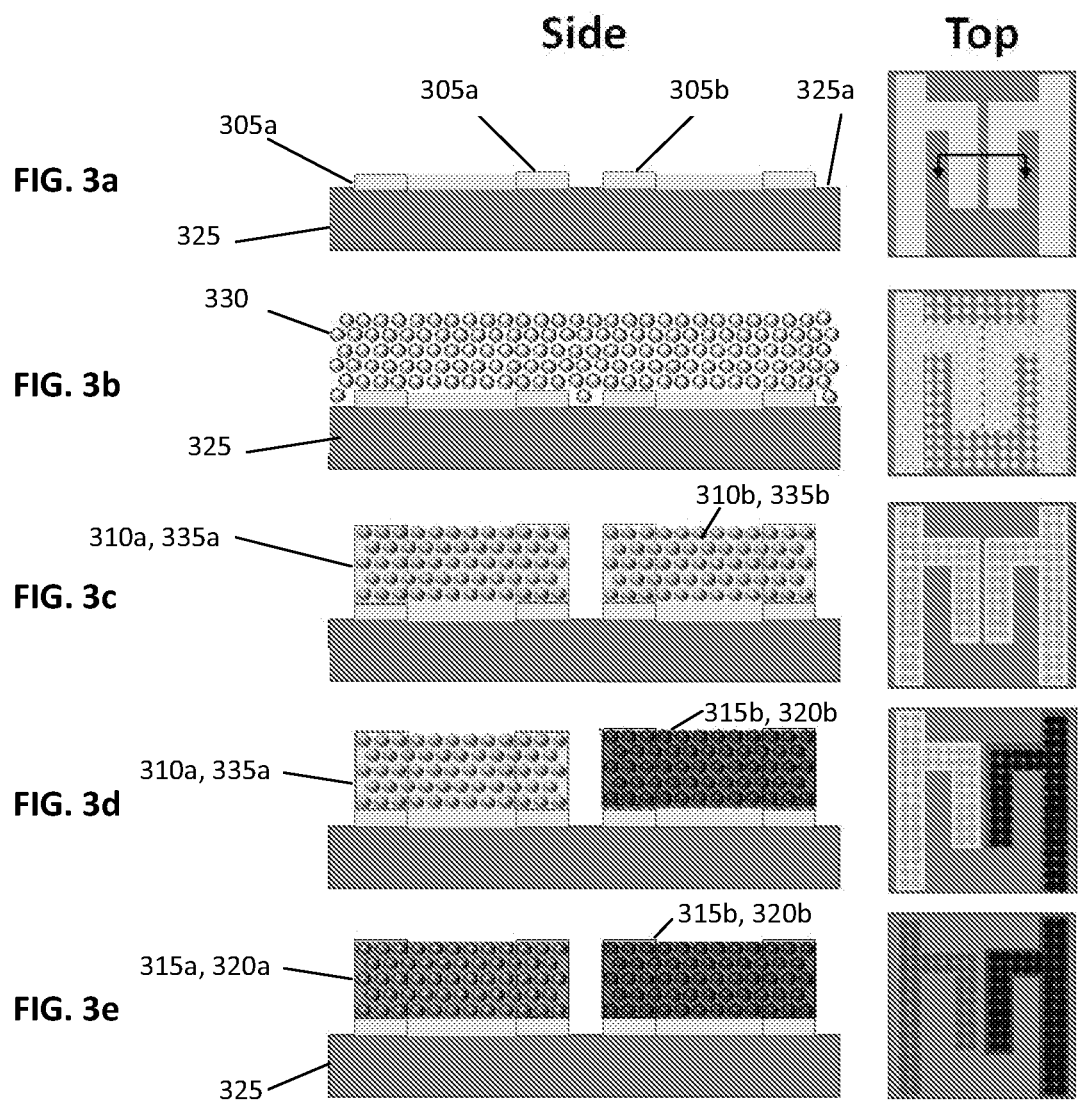

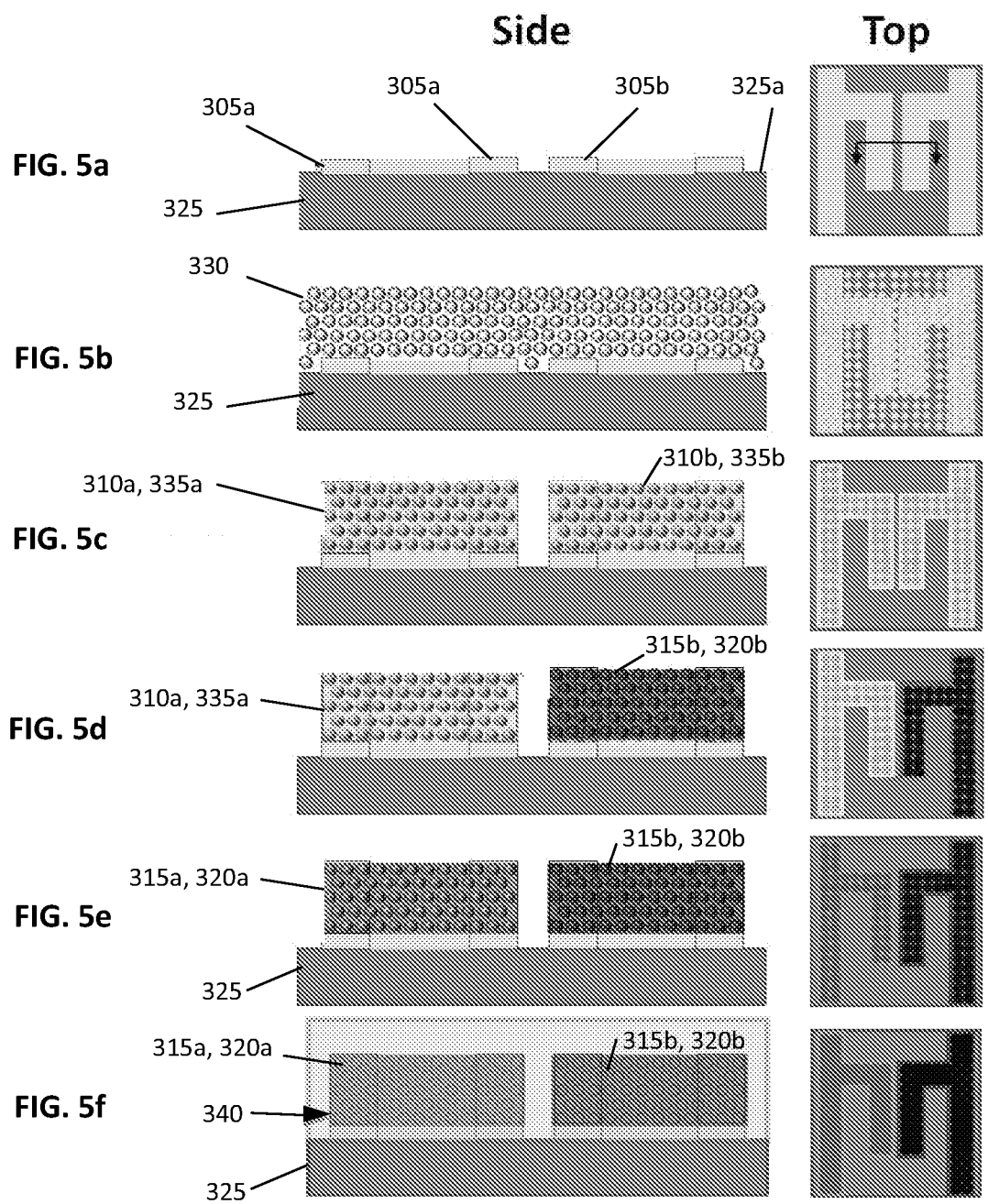

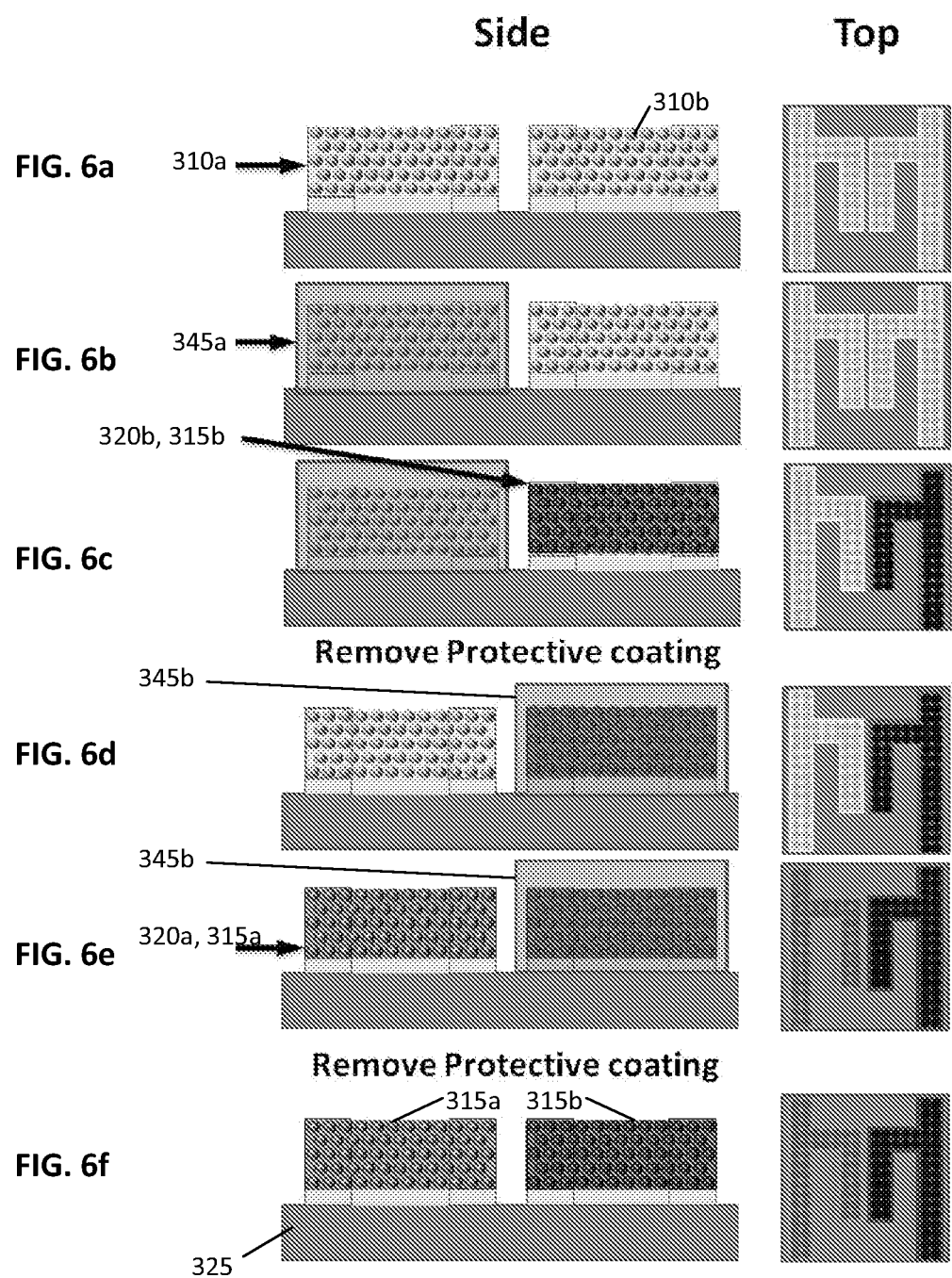

THREE-DIMENSIONAL (3D) POROUS ELECTRODE ARCHITECTURE FOR A MICROBATTERY

RELATED APPLICATIONS

The present patent document is the national stage of International Patent Application PCT/US2012/048057, filed on Jul. 25, 2012, and which claims the benefit of the filing date under 35 U.S.C. §119(e) of Provisional U.S. Patent Application Ser. No. 61/513,178, filed Jul. 29, 2011. Both patent applications are hereby incorporated by reference in their entirety.

TECHNICAL FIELD

This disclosure is related generally to energy storage technology, and more particularly to miniature batteries ("microbatteries").

BACKGROUND

Microelectronics, microsensors, and microelectromechanical systems (MEMS) typically utilize energy sources located off-chip. Integrating microscale energy storage onchip with microdevices is essential for achieving autonomous devices. Electrical energy for microdevices can be provided by either capacitors or batteries. Capacitors can discharge very quickly, but inherently contain very little energy. Traditional batteries contain large amounts of energy, but cannot discharge quickly. Other power sources, such as fuel cells, are practical for larger systems, but are not easily miniaturized.

Batteries are limited by their maximum power density/discharge rate because of slow kinetics related to ion and electron transport. Reducing the characteristic ion and electron diffusion lengths within the active battery material has proven to be successful in increasing power densities and discharge rates; however, this has also resulted in a substantial decrease in energy density. Miniature batteries have been developed to power $cm^2$ sized devices and microelectronics, but they have not seen widespread adoption due to limits in their energy and power capabilities. Thin-film lithium ion batteries, for example, have high power densities due to thin active material layers (<1 µm), but the total power and energy provided is generally not sufficient to meet the demands of micro devices due to the two-dimensional architecture inherent to thin films. Building into the third dimension—e.g., making thicker active material layers—can boost the energy density; however, electron and ion diffusion lengths concomitantly increase, thereby reducing power density.

BRIEF SUMMARY

A three-dimensional porous electrode architecture for a microbattery and a method of making the porous electrode architecture have been developed.

The method includes providing a surface comprising a first conductive pattern and a second conductive pattern thereon, where the first and second conductive patterns are electrically isolated from each other, and forming a lattice structure on the surface. Interstices of the lattice structure are infiltrated with a first conductive material and a second conductive material, where the first and second conductive materials propagate through the interstices in a direction away from the substrate to reach a predetermined thickness. The first conductive material spans an area of the surface overlaid by the first conductive pattern and the second conductive material spans an area of the surface overlaid by the second conductive pattern. The lattice structure is removed to form a network of interconnected voids in each of the first and second conductive materials, thereby forming three-dimensional first and second conductive scaffolds. Each conductive scaffold has the predetermined thickness and a lateral size and shape defined by the respective conductive pattern. An anode active material is conformally deposited on the second conductive scaffold to form a porous anode, and a cathode active material is conformally deposited on the first conductive scaffold to form a porous cathode, thereby forming a three-dimensional battery electrode architecture.

The three-dimensional porous electrode architecture includes a substrate having first and second conductive patterns disposed thereon where the first and second conductive patterns are electrically isolated from each other, a three-dimensional porous cathode disposed on the first conductive pattern, and a three-dimensional porous anode disposed on the second conductive pattern. The porous cathode includes a first conductive scaffold conformally coated with a layer of a cathode active material and having a porosity defined by a network of interconnected pores, where the first conductive scaffold has a lateral size and shape defined by the first conductive pattern and porous side walls oriented substantially perpendicular to the substrate. The porous anode includes a second conductive scaffold conformally coated with a layer of an anode active material and having a porosity defined by a network of interconnected pores, where the second conductive scaffold has a lateral size and shape defined by the first conductive pattern and porous side walls oriented substantially perpendicular to the substrate. Each of the porous anode and the porous cathode overlies an area on the substrate of about 10 $cm^2$ or less in size, and the porous anode and the porous cathode are spaced apart on the substrate by a separation distance of about 100 microns or less.

BRIEF DESCRIPTION OF THE DRAWINGS

FIGS. 3a-3e show a fabrication process flow for producing exemplary 3D porous electrodes, which includes patterning a conductive layer on a glass substrate, self-assembling polystyrene (PS) particles on the substrate, electrodepositing a conductive material to fill the voids between the PS particles, etching away the PS particles to form a 3D conductive scaffold, and then electrodepositing each of the cathode and anode active materials onto one of the conductive scaffolds;

FIGS. 5a-5f show steps of an exemplary "in-situ process" for active material deposition;

FIGS. 6a-6f show schematically an exemplary electrode protection process sequence in which a removable protective coating is applied to each conductive scaffold;

DETAILED DESCRIPTION

High power density microbatteries having porous three-dimensional (3D) nanostructured electrodes have been fabricated and characterized. Unlike most high-power battery designs, the microbatteries set forth in the present disclosure do not sacrifice the high energy density of a conventional battery in order to obtain a high power density. Due to recent advances in electrode design and integrated fabrication, the microbatteries can achieve power densities an order of magnitude higher than the power density of any current battery and close to what can be achieved with supercapacitors—while retaining the ~150 Wh/kg energy density of current high energy density Li-ion batteries. The enhanced power is due in part to a nanostructured porous 3D electrode architecture that presents both a high surface area and reduced ion diffusion lengths across the active material, allowing for >1000 C rates without sacrificing energy density. The C rate of a battery measures how effective a battery is at producing power for its energy capacity. For example, 1 C rate discharges a battery in 1 hour with a constant current. A battery discharged at an n C rate is done so with a current n times the 1 C current. The optimal microbattery has both high energy and high C rate (high power).

The critical advance set forth in the present disclosure is the integrated fabrication of a porous 3D cathode and a porous 3D anode—each having a microscale footprint and based on entirely different chemistries—in close proximity on a single substrate. The integrated battery electrode architecture exploits the nanoscale ion diffusion lengths possible across a thin layer of active material, which leads to a high C rate, and further reduces diffusion lengths across the electrolyte, offering another means of boosting power density. Microfabrication technology, self-assembly, and electrodeposition are combined to produce the high power microbatteries, which may achieve, according to one embodiment, a power density of 2827 $\mu W/mm^3$ at a discharge rate of 360 C and an energy density of 5.67 $\mu Wh/mm^3$.

Before describing in detail the integrated fabrication of the 3D porous electrodes, the nanostructured porous electrode concept that underlies the integrated microbattery structure is summarized below in reference to FIGS. 1a-1b and FIGS. 2a-2b.

Figures 1A, 1B:
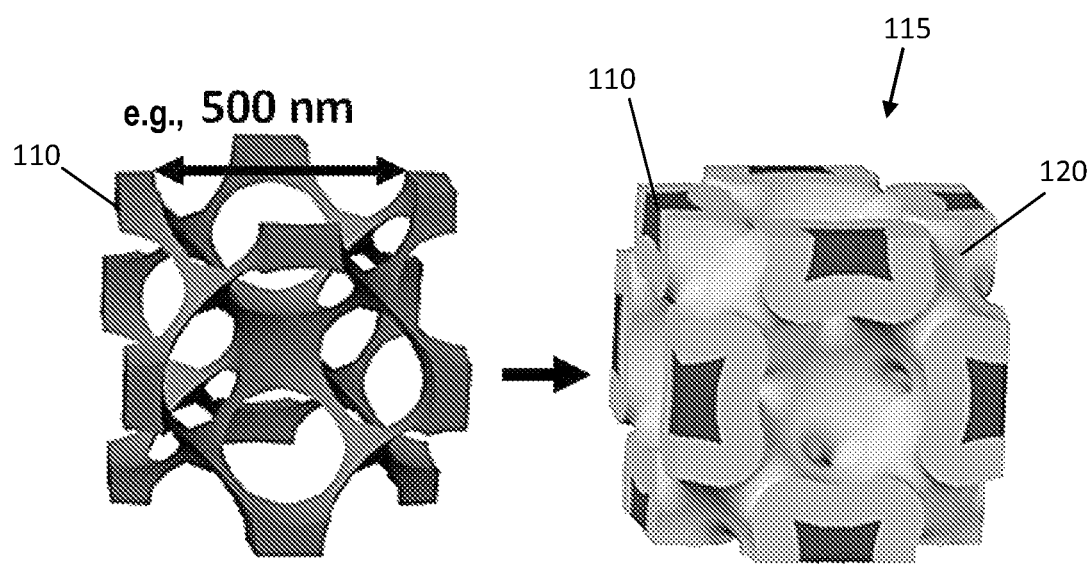
FIGS. 1a and 1b are renderings of a unit cell of an exemplary 3D conductive scaffold and a 3D porous electrode, respectively.

FIGS. 1a and 1b are renderings of a unit cell of an exemplary 3D conductive scaffold 110 and a 3D porous electrode 115, respectively. To form the 3D porous electrode 115, an electrochemically active material 120 is conformally deposited on the conductive scaffold 110, which acts as a current collector and may have a nanoscale or microscale pore size. The thickness of the active material layer (e.g., 20-100 nm) controls the ion diffusion length while the tailorable porosity (e.g., 200 nm-2 μm) allows ions to interpenetrate the scaffold. Such porous 3D electrodes 115 can be employed with most battery chemistries, including but not limited to nickel metal hydride and lithium ion chemistries.

Figure 2A:
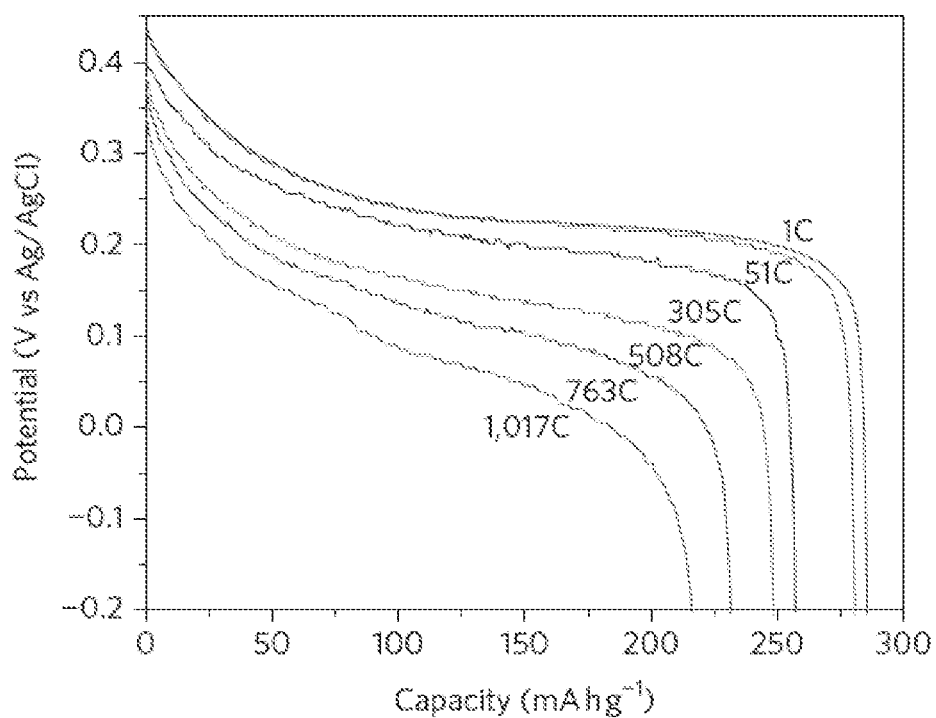
FIGS. 2a and 2b are discharge curves of exemplary porous 3D electrodes based on nickel metal hydride (FIG. 2a) and lithium ion (FIG. 2b) chemistries.
Figure 2B:
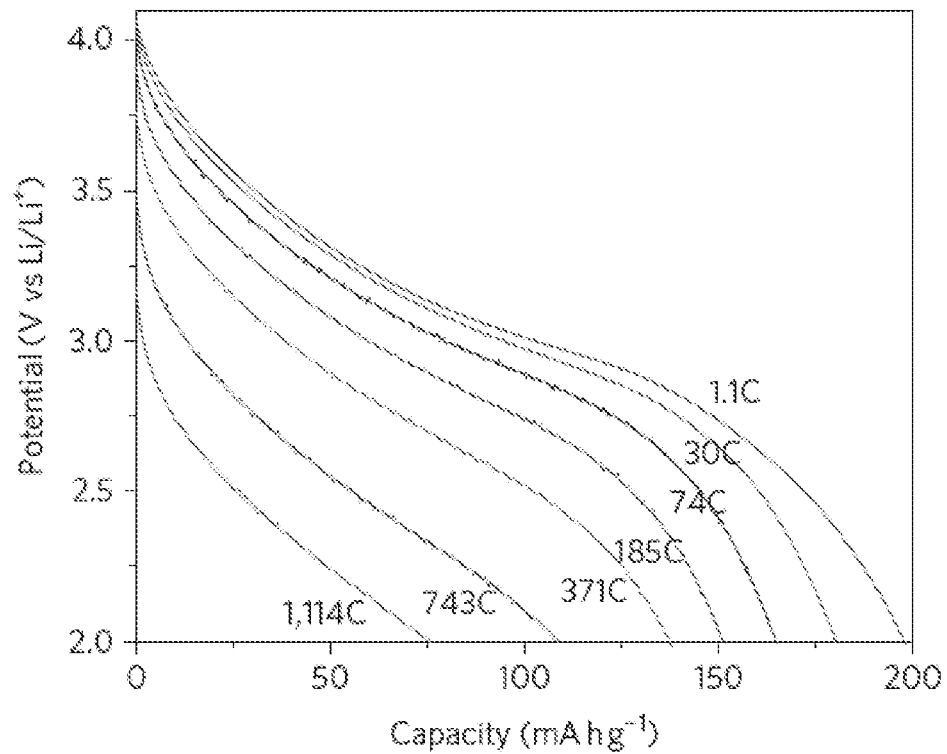

Referring to FIGS. 2a and 2b, discharge curves of porous 3D electrodes based on nickel metal hydride and lithium ion chemistries are shown. Nickel metal hydride (NiOOH) cathodes are able to discharge at 305 C while retaining 90% of the 1 C capacity and 1,017 C while retaining 75% of the 1 C capacity. Lithium ion cathodes ($LiMnO_2$) are able to discharge at 185 C and retain 76% of the 1 C rate capacity and 1,114 C while retaining 38% of the 1 C rate. These rates have not been attained previously.

Referring now to FIGS. 3a-3e, the inventors have combined microfabrication technology with electrochemistry to synthesize such 3D porous electrodes in parallel on a single substrate, thereby enabling the creation of miniaturized battery cells of unprecedented performance. FIGS. 3a-3e provide side and top views of an exemplary process flow to fabricate a microbattery cell based on a 3D porous electrode architecture.

In FIG. 3a, a first conductive pattern 305a and a second conductive pattern 305b are formed on a surface 325a of a substrate 325 using photolithography or another patterning method. The first and second conductive patterns 305a, 305b are electrically isolated from each other. The substrate 325 may be made of (or include a coating of) any material that is non-reactive with the electrode chemistries. For example, $SiO_2$ may be employed.

Figure 4A:
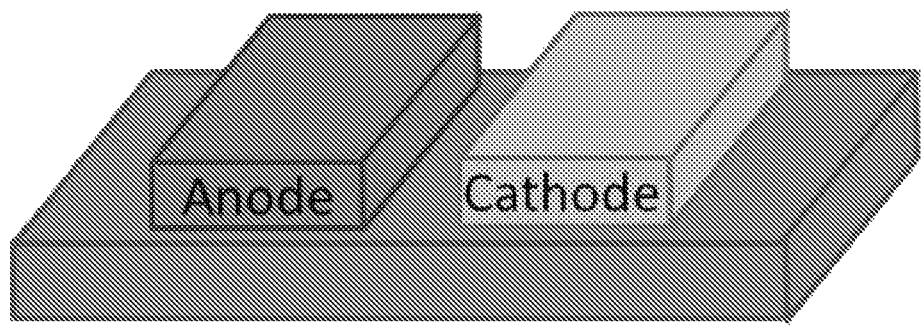
FIGS. 4a and 4b show exemplary 3D porous electrode architectures.
Figure 4B:
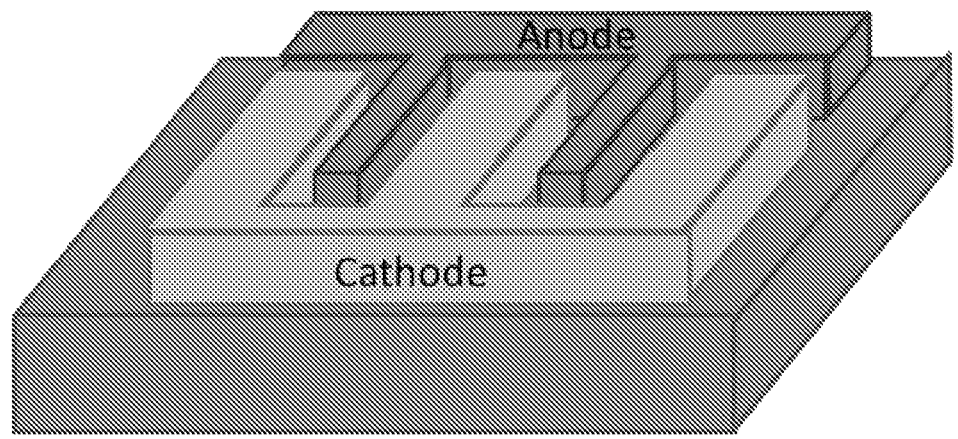

The conductive patterns 305a, 305b may be formed to have any size, shape and spacing achievable with known patterning techniques. Typically, for the present microbattery application, the conductive patterns have a maximum lateral dimension (i.e., length) of between about 5-500 microns (or in some cases between about 50-500 microns) and a shape and spacing that promote reduced diffusion distances in the resultant battery cell. In one example, the conductive patterns may be side-by-side rectangular patterns that lead to the electrode architecture shown in FIG. 4a. In another example, the conductive patterns may have an interdigitated relationship that leads to the interdigitated 3D electrode architecture shown in FIG. 4b, which allows for a reduced average electrode spacing (and potentially an increased power output).

After the first and second conductive patterns 305a, 305b are formed, a colloidal solution comprising a plurality of microparticles may be deposited onto the surface and assemble into a lattice structure (e.g., a face centered cubic (FCC) opal lattice) 330, as shown schematically in FIG. 3b. The lattice structure 330, which ultimately serves as a sacrificial scaffold in forming the 3D porous electrodes, may be ordered (periodic), as shown in the figure, or disordered.

Generally speaking, the lattice structure is a solid scaffold that includes interstices or pores, at least some of which may be interconnected, throughout the structure.

Figures 14A, 14B:
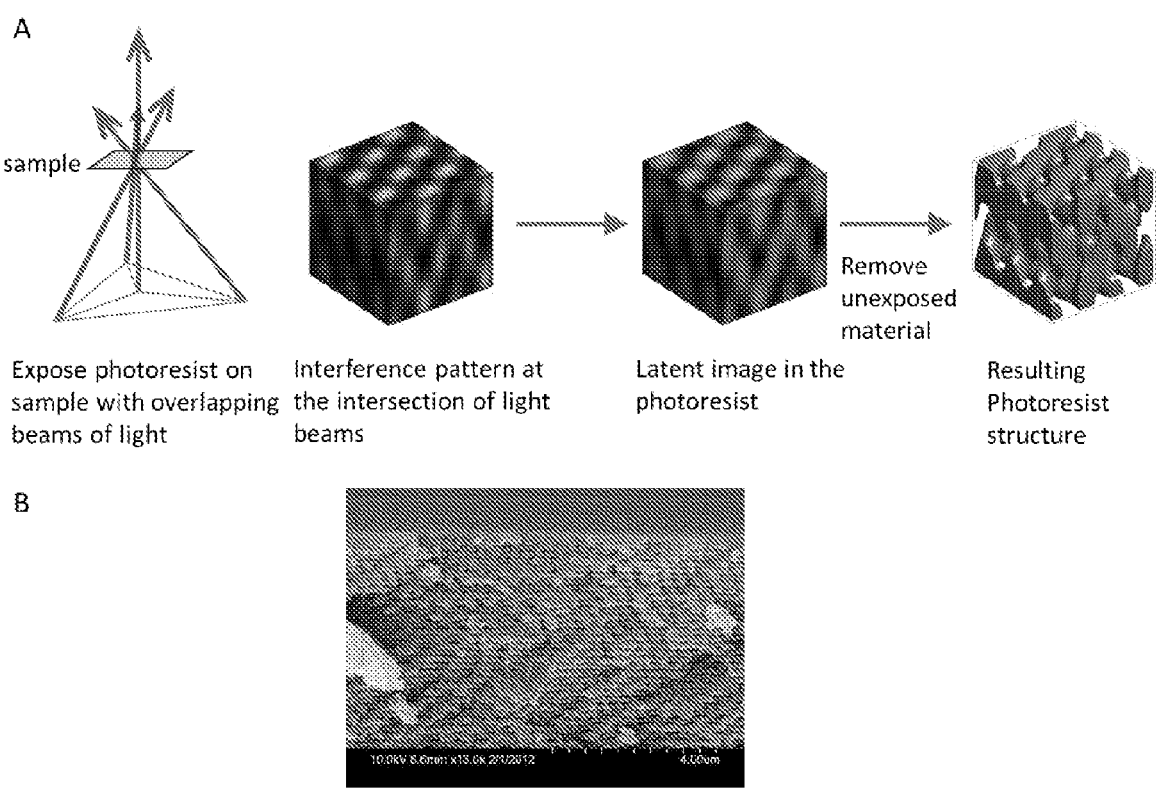
FIG. 14a shows an example of interference lithography for fabrication of a lattice structure using a four laser beam approach.
FIG. 14b is a scanning electron microscopy (SEM) image of an exposed photoresist used to form a microbattery electrode scaffold.

As an alternative to deposition of a colloidal solution, interference lithography may be employed to form the lattice structure. For example, photoresist may be applied to the surface after the first and second conductive patterns are formed and then exposed to an interference pattern of light, which includes areas of constructive and destructive interference. Consequently, exposed regions and unexposed regions of the photoresist are created. See FIGS. 14a and 14b. The interference pattern can be produced by intersecting four laser beams or by passing light through a phase mask or an inverted prism. Then, depending on whether the photoresist is positive or negative, either (a) the exposed regions or (b) the unexposed regions are selectively removed. The remaining photoresist may serve as a 3D bicontinuous and porous scaffold (i.e., the lattice structure described above) for further processing. This technique may be advantageous because it can be integrated with conventional microfabrication and can produce lattice structures with unique 3D geometries. Other methods that may be suitable for forming lattice structures include chemical etching, plasma etching, drilling, ion or electron beams, sintering, or other processes.

Next, interstices of the lattice structure 330 (formed via microparticle assembly, interference lithography, or another method) are infiltrated with a first conductive material 335a and a second conductive material 335b (e.g., nickel, aluminum or another metal), as shown schematically in FIG. 3c. The first and second conductive materials 335a, 335b propagate through the interstices of the lattice structure 330 in a direction away from the substrate 325 to reach a predetermined thickness. The first conductive material spans an area of the surface 325a overlaid by the first conductive pattern 305a and the second conductive material 305b spans an area of the surface 325a overlaid by the second conductive pattern 305b.

Infiltration of the first and second conductive materials 335a, 335b is typically carried out by electrodeposition using the first and second conductive patterns as electrodes, respectively, although other deposition routes may also be suitable. For example, chemical vapor deposition (CVD), physical vapor deposition (PVD), atomic layer deposition (ALD), sol-gel or another technique may be used for infiltration if the deposited material can be confined to the conductive pattern.

After the infiltration is carried out, the lattice structure is removed to form voids in each of the first and second conductive materials 335a, 335b, thereby forming 3D first and second conductive scaffolds 310a, 310b of the predetermined thickness. The first conductive scaffold 310a may also be referred to as a "cathode scaffold," and the second conductive scaffold 310b may be referred to as an "anode scaffold." Each conductive scaffold 310a, 310b has (a) a lateral size and shape defined by the underlying conductive pattern and (b) an arrangement of interconnected voids defined by the lattice structure (e.g., microparticles) that has been removed. For example, spherical microparticles that are arranged in a close-packed cubic lattice and sintered together lead to a network of interconnected voids of the same size, shape and periodicity in the first and second conductive scaffolds.

If desired, the size of the voids may be increased after removal of the microparticles. Chemical etching, electropolishing (electrochemical etching), or anodization followed by chemical etching may be used to enlarge the void size and thereby increase the volume fraction of porosity of one or both conductive scaffolds. For example, a conductive scaffold formed from a close packed lattice structure may have a porosity of 74%; this can be increased to 75% or larger (e.g., from about 75% to about 99% porosity) by electrochemical etching. The porosity exhibited by the conductive scaffold shown in FIG. 1a is the result of etching to increase the void size after removal of the microparticles.

Also or alternatively, interconnections between the microparticles of the lattice structure may be enlarged prior to removing the lattice structure so as to increase the connectivity of the resulting conductive scaffold, as described in U.S. patent application Ser. No. 13/467,419, "Method of Enhancing the Connectivity of a Colloidal Template, and a Highly Interconnected Porous Structure," filed on May 9, 2012, which is hereby incorporated by reference in its entirety.

Additional details about the process to this point may be found in PCT Patent Application No. PCT/US2011/020301, "Three-Dimensional (3D) Porous Device and Method of Making a 3D Porous Device," filed Jan. 6, 2011, and in U.S. Patent Application Publication 2010/0068623, "Porous Battery Electrode for a Rechargeable Battery and Method of Making the Battery Electrode," filed Oct. 7, 2009, both of which are hereby incorporated by reference in their entirety.

After formation and optional etching of the first and second conductive scaffolds 310a, 310b, a layer of an electrochemically active material 320a, 320b is conformally deposited on each scaffold 310a, 310b to define a porous cathode 315a and a porous anode 315b for the microbattery cell. Conformal deposition of the active material refers to substantially complete coverage of all exposed surfaces of the underlying conductive scaffold 110 by the active material 120, as illustrated in FIG. 1b. This may be achieved by electrodeposition using the respective conductive scaffold as an electrode. Alternatively, another deposition method known in the art, such as chemical vapor deposition (CVD), sol-gel, or atomic layer deposition (ALD), may be used to conformally deposit the active materials.

In the case of a Li-ion battery, a typical cathode active material is MnOOH and a typical anode active material is a Ni—Sn alloy, although other active materials may be employed, and the method is not limited to Li-ion battery chemistries. For example, suitable anode active materials may include lithium, graphite, silicon, iron oxide, copper oxide, tin oxide, nickel phosphide, titanium oxide, zinc, or a copper-tin alloy, and suitable cathode active materials may include materials based on cobalt oxide, lithium iron phosphate, manganese oxide, nickel oxyhydroxide, copper (II) oxide or vanadium oxide.

The order in which the active materials are deposited—that is, whether the cathode active material is deposited on the first conductive scaffold before the anode active material is deposited on the second conductive scaffold, or vice versa—is critically important due to the close proximity of the conductive scaffolds and the vastly different electrode chemistries involved. In typical batteries, the electrode materials are fully processed independently and then combined to form a battery cell. Here, the processing and combination occur simultaneously, which begs the question: Can one electrode can be successfully formed without damaging or destroying the other?

The inventors discovered that if a high performance microbattery is to be successfully fabricated, the anode active material is advantageously deposited before the cathode active material—although this conclusion runs counter to the conventional wisdom of those skilled in the art of electrodeposition. This approach to active material deposition, in which the deposition order is critical, may be referred to as the "in-situ process," and it is shown schematically in FIGS. 5a-5f.

The inventors also realized that the requirement of a particular deposition order can be circumvented by depositing a removable protective coating on least one of the electrode structures during part of the processing, thereby preventing unintended and in some cases detrimental chemical reactions. This approach to active material deposition may be referred to as the "electrode protection process."

Thus, in the in-situ process, an anode active material 320b is conformally deposited onto the second conductive scaffold 310b to form the porous anode 315b first, as shown in FIG. 5d, and then a cathode active material 320a is conformally deposited onto the first conductive scaffold 310a to form the porous cathode 315a, as shown in FIG. 5e. Finally, the substrate 325 may be dipped or immersed in molten lithium salts 340 in order to lithiate the cathode active material 320a (FIG. 5f).

In the electrode protection process, a removable protective coating is applied to one (or both) of the conductive scaffolds—either before or after the active material is deposited thereon—prior to processing the other electrode.

FIGS. 6a-6f show schematically an exemplary electrode protection process sequence in which a removable protective coating 345a, 345b is applied to each conductive scaffold 310a, 310b at different times during the process. In the case of the cathode 315a, the protective coating 345a is applied to the conductive scaffold 310a before the cathode active material 320a is deposited, and in the case of the anode 315b, the protective coating 345b is applied to the scaffold 310b after the anode active material 320b has been deposited. Referring to the figures, after fabrication of the first and second conductive scaffolds 310a, 310b (i.e., cathode and anode scaffolds, respectively) (FIG. 6a), a removable protective coating 345a is applied to the first conductive scaffold 310a (FIG. 6b) prior to depositing the anode active material 320b (FIG. 6c) on the second conductive scaffold 310b to form the porous anode 320b. After the porous anode 315b is formed, the protective coating 345a is removed so that the cathode active material 320a may be deposited. As shown schematically in FIGS. 6d-6f, the porous anode 320b is first covered with a removable protective coating 345b (FIG. 6d) and then the cathode active material 320a is deposited on the first conductive scaffold 310a (FIG. 6e). After deposition and processing of the cathode active material 320a, the protective coating 345b may be removed, revealing a 3D porous electrode architecture 315a, 315b.

It is also envisioned that only one of the electrode structures may be covered with a protective coating during the fabrication process. This may be appropriate when only one of the conductive scaffolds or active material layers is susceptible to a reaction during processing of the other electrode structure. For example, the process steps shown in FIGS. 6a-6c, including fabrication of the conductive scaffolds 310a, 310b and deposition of the anode active material 320b to form the porous anode 315b, may be carried out without a protective coating on the cathode scaffold, and the protective coating may be applied only to the porous anode, as shown in FIG. 6d, before depositing the cathode active material (FIG. 6e). Similarly, the process steps of FIGS. 6a-6c may be carried out with a protective coating as shown, and the process steps of FIGS. 6d-6f may be carried out without a protective coating on the anode material. Other examples for particular battery chemistries are set forth below.

The removable protective coating may be a photoresist for low temperature processing and a silicon-based resist for high temperature processing; in addition, polyacrylonitrile and similar polymers may be employed, as well as metals and dielectrics that may be selectively etched away.

After the cathode active material has been conformally deposited using one of the approaches described above, the resultant porous cathode may then be lithiated by immersing the porous cathode and the porous anode in a solution containing lithium salts or in a bath of molten lithium salts. Lithium salts that may be employed for lithiation include, for example, lithium nitrate and lithium hydroxide. Surprisingly, interaction of a Ni—Sn porous anode with lithium salts during the in-situ process does not have a negative impact on the performance of the resulting Li-ion microbattery. Although a reaction of the lithium salts with the Ni—Sn anode material cannot be prevented, the fortuitous result is the formation of a conductive oxide, specifically tin oxide, which has an anode chemistry that is compatible with lithium ion batteries. Accordingly, the tin oxide that forms upon exposure of the Ni—Sn anode material to lithium salts during lithiation is not detrimental to the performance of the battery. This finding established that (contrary to the conventional wisdom of those skilled in the art of electrodeposition) deposition of the anode material could proceed before deposition and lithiation of the cathode material without diminishing the performance of the microbattery.

Once the porous cathode is lithiated, the resultant 3D porous electrode architecture may be immersed in an electrolyte for charging and discharging. Advantageously, for microbattery applications, the 3D porous electrodes may be spaced apart on the substrate by a separation distance of about 100 microns or less, and each of the porous electrodes may overlie an area on the substrate of about 0.5 mm$^2$ or less in size, although much larger areas (e.g., about 50 cm$^2$ or less) are also possible. The separation distance may also be about 60 microns or less, or about 30 microns or less, and the area overlaid by each of the porous electrodes may be about 0.3 mm$^2$ or less, or about 0.1 mm$^2$ or less.

Figure 7:
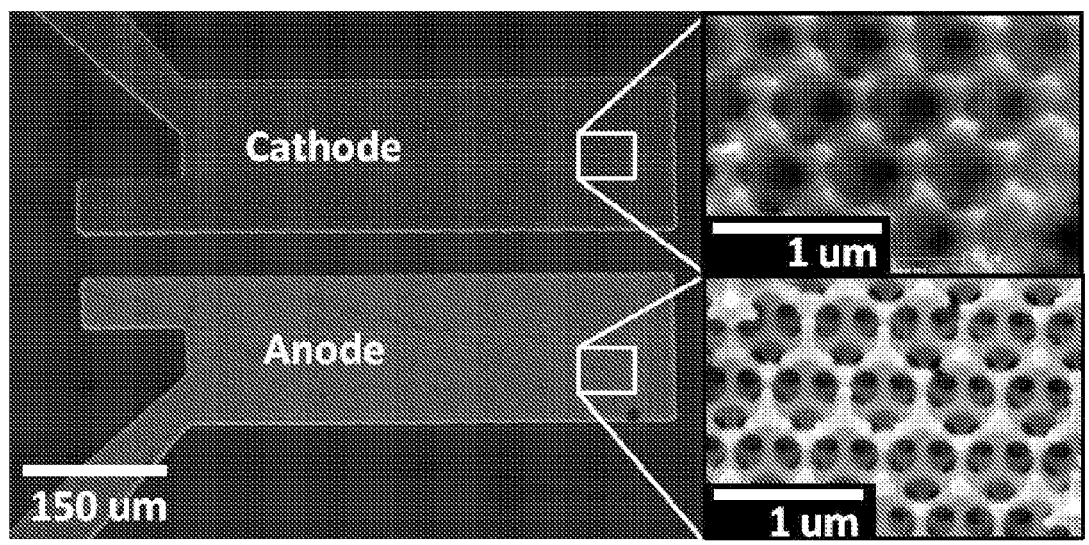
FIG. 7 shows scanning electron micrographs of a single battery cell with an anode on the bottom, cathode on the top, and close up images of the nanostructured electrodes on the right, where the thicknesses of the cathode and anode active materials are approximately 20 nm and less than 20 nm, respectively.

FIG. 7 shows a scanning electron micrograph of a fabricated microbattery cell. The anode is on the bottom and cathode on the top. The footprint of each electrode is 150×400 μm and the thickness or height is 10 μm, which corresponds to about 20 layers of polystyrene spheres. The height of the electrodes can be increased to about 100 μm if thicker layers of polystyrene are self-assembled. Beyond a thickness of about 100 μm, further refinements may be needed to reduce defect densities and cracking.

The nanostructure of the 3D electrodes can be seen on the right of FIG. 7. It is possible to tailor the thickness of the active material to tune the energy and power density of the anode and cathode. The gravimetric capacity of lithiated MnO$_2$ is 198 mAh/g. The nickel-tin anode material has approximately four times the gravimetric capacity, but suffers from slower reaction kinetics than the MnO$_2$. To balance the energy and power, the cathode can be deposited to a larger thickness on the nickel scaffold than on the anode. In this example, approximately 20 nm of lithiated manganese oxide is deposited on the cathode, resulting in a ~70% porous electrode. Less than 20 nm of active material is deposited on the anode. Doubling the thickness of the cathode active material from 20 nm to 40 nm would increase the energy density by 1.83 times, but would result in a 4-fold increase in the diffusion time.

Example 1

In-Situ Process to Form a Ni—Sn or Li Porous Anode and a Lithiated MnO$_2$ Porous Cathode First, a glass substrate is patterned with 8 nm of chromium and 100 nm of gold to form the microbattery template, i.e., closely spaced but separated conductive patterns on which the cathode and electrode may be formed. Polystyrene (PS) spheres of 500 nm in diameter then self-assemble on top of the substrate and form a face-centered cubic (FCC) lattice structure. After assembly, the substrate is sintered for 3 hours at 95° C. Nickel is then electrodeposited to fill the voids of the PS lattice structure. This resulting nickel structure forms the 3D scaffold for the electrodes after the PS is etched away. Lithium (Li) metal or a nickel-tin alloy, 79% tin by weight, is electrodeposited on the anode electrode. The layer thickness can be adjusted between tens of nanometers for high discharge rates to hundreds of nanometers for higher energy storage. MnOOH is then electrodeposited on the cathode section of the scaffold. The substrate is then immersed in molten lithium salts, 2.35:1 lithium nitrate:lithium hydroxide, at 300° C. for 30 minutes to form lithiated manganese oxide. After fabrication, the electrodes may be immersed in an electrolyte to test their charging and discharging characteristics.

Example 2

Electrode Protection Process to Form a Ni—Sn Porous Anode and a Lithiated $MnO_2$ Porous Cathode In another example, a glass substrate is patterned with 8 nm chromium and 100 nm gold to form a template for the closely spaced cathode and electrode. PS particles of 1.8 microns in diameter are self-assembled onto the substrate, forming an FCC lattice structure. Nickel is electrodeposited to fill the voids of the PS lattice structure. The resulting nickel structure forms the 3D scaffold for the electrodes after the PS is etched away. A high temperature Si-based photoresist is deposited on the anode scaffold to protect it during processing of the cathode, and then MnOOH is electrodeposited on the cathode scaffold. The layer thickness can be adjusted between tens of nm for high discharge rates to hundreds of nm for higher energy storage. The substrate is then immersed in molten lithium salts, 2.35:1 lithium nitrate and lithium hydroxide, at 300° C. for 30 minutes to form lithiated manganese oxide. The Si-based photoresist is then removed, and polyacrylonitrile is electrodeposited on the cathode to protect it from the anode electroplating solution. A nickel-tin alloy, 79% tin by weight, is deposited on the anode electrode scaffold. The polyacrylonitrile is then removed, and the electrodes are immersed in an electrolyte to test their charging and discharging characteristics.

Example 2 can be corrected to include the deposition of a high temperature silicon based photoresist on the anode scaffold prior to deposition of MnOOH. This follows the idea outlined in the first part of and parallels example 4 except in example 2 the anode material is Ni—Sn and is electro-chemically deposited.

Example 3

Electrode Protection Process to Form Si or $SnO_2$ Porous Anode and Lithiated $MnO_2$ Porous Cathode Conductive porous scaffolds may be fabricated as described previously. The first conductive scaffold and the substrate are covered with a layer of photoresist. Silicon (Si) or tin oxide ($SnO_2$) are conformally deposited by chemical vapor deposition onto the anode scaffold. The photoresist is removed from the cathode scaffold and the substrate using methods known in the art. The cathode active material, MnOOH, is then electrodeposited onto the cathode scaffold. Finally, the entire substrate is immersed in lithium salts to form lithiated $MnO_2$. The final architecture includes a 3D porous Si (or $SnO_2$) anode alongside a 3D porous lithiated $MnO_2$ cathode.

Example 4

Electrode Protection Process to Form Si or $SnO_2$ Porous Anode and Lithiated $MnO_2$ Porous Cathode Conductive porous scaffolds are fabricated as described previously. The anode scaffold is covered with a layer of high temperature photoresist. MnOOH is electrodeposited onto the cathode scaffold, and then the entire substrate is immersed in lithium salts to form a lithiated $MnO_2$ porous cathode. After the porous cathode is formed, the layer of high temperature photoresist is removed from the anode scaffold. The cathode and substrate are then covered with a layer of photoresist, and Si or $SnO_2$ is deposited by chemical vapor deposition onto the anode scaffold to form a porous 3D anode. The final architecture includes a 3D porous Si (or $SnO_2$) anode and a 3D porous lithiated $MnO_2$ cathode.

Example 5

Electrode Protection Process to Form Zn Porous Anode and NiOOH Porous Cathode

Conductive porous scaffolds are fabricated as described previously. Nickel oxyhydroxide (NiOOH) is electrodeposited onto the first conductive scaffold to form a porous cathode. The porous cathode is protected with a layer of photoresist or an electrodeposited polymer. Zinc (Zn) is then electrodeposited onto the second conductive scaffold. The protective layer is removed, and the final architecture includes a 3D porous NiOOH cathode and a 3D porous Zn anode.

Example 6

Electrode Protection Process to Form Zn Porous Anode and $MnO_2$ Porous Cathode

Conductive porous scaffolds are fabricated as described previously. $MnO_2$ is electrodeposited onto the first conductive scaffold to form a porous cathode. The porous cathode is protected with a layer of photoresist or an electrodeposited polymer. Zn is then electrodeposited onto the second conductive scaffold. The protective layer is removed, and the final architecture includes a 3D porous $MnO_2$ cathode and a 3D porous Zn anode.

Example 7

Electrochemical Performance of Li Ion Microbattery—Side-by-Side Electrode Architecture The electrochemical performance of the lithium ion microbattery formed by the process described in Example 1 was characterized in a three electrode system with the cathode as the working electrode, the anode as the counter electrode, and lithium metal as the reference electrode. The microbattery of this example has the side-by-side electrode architecture shown schematically in FIG. 4a or FIG. 7.

Figure 8:
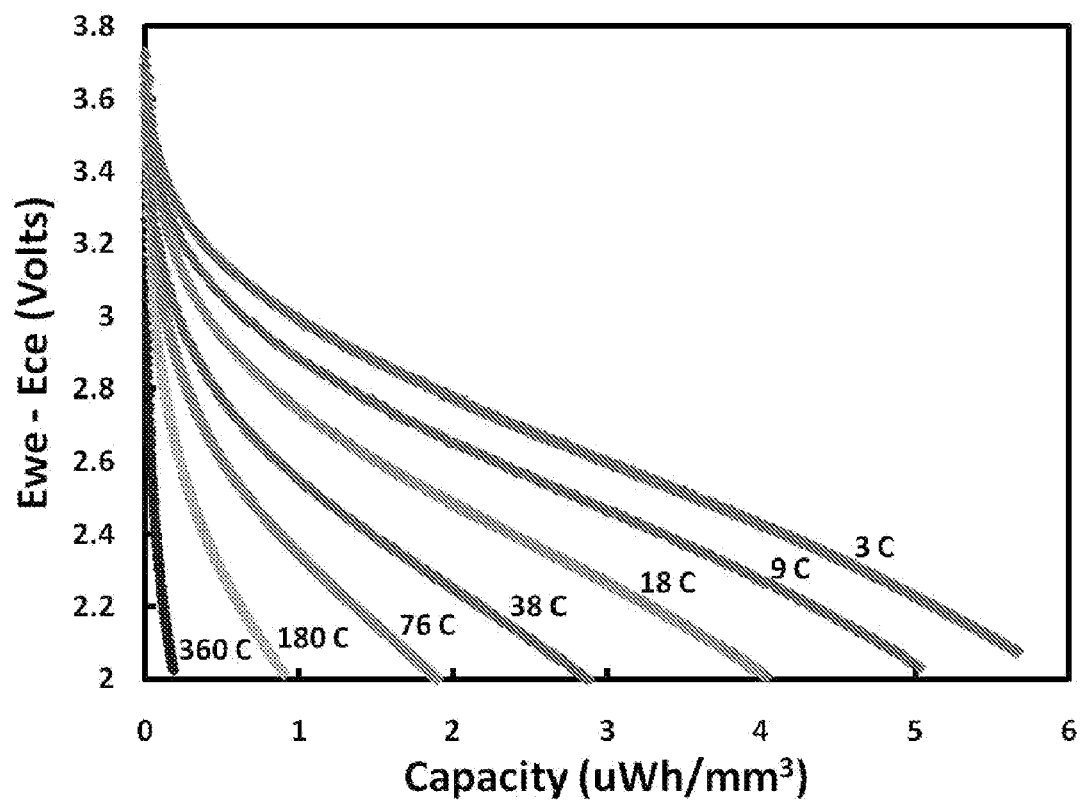
FIG. 8 shows discharge curves at various C rates for an exemplary microbattery substrate, which includes 16 individual cells plus interconnects.

FIG. 8 shows discharge curves of the microbattery substrate at various C rates. The microbattery substrate was discharged from 3.8 to 2 volts and includes 16 individual cells plus interconnects. At a 3 C rate the microbattery cell was discharged at a 2 µA current and achieved an energy and power density of 5.67 µWh/mm$^3$ and 24.52 µW/mm$^3$. At a 9 C rate the microbattery retained 89% of the 3 C energy and achieved a 72.90 µW/mm$^3$ power density. The maximum power density was achieved at a 360 C discharge rate. At 360 C, the micro battery was discharged with a 240 µA current and achieved a 2827 µW/mm$^3$ power density.

Example 8

Electrochemical Performance of Li Ion Microbattery—Interdigitated Electrode Architecture The electrochemical performance of the lithium ion microbattery formed by the process described in Example 1 was characterized as a full cell in 1:1 ethylene carbonate (EC) and dimethyl carbonate (DMC) with 1 molar LiClO$_4$. The microbatteries of this example have the interdigitated architecture shown schematically in FIG. 4b and the geometries and characteristics provided in Tables 1 and 2 below. The cell, which uses a lithiated manganese oxide active layer for the cathode and nickel-tin active layer for the anode, is discharged at C rates ranging from 1 to 1000.

TABLE 1

Geometries of Microbatteries Based on Interdigitated Electrodes

| Battery | 1 C Current (µA) | Footprint (mm$^2$) | Electrode Height (µm) | Pore Size (nm) | Effective Cathode Thickness (nm) | Electrode Width (µm) | Electrode Pitch (µm) |
| --- | --- | --- | --- | --- | --- | --- | --- |
| A | 1.7 | 2 | 14.9 | 500 | 60 | 33 | 45 |
| B | 0.7 | 1.7 | 12.6 | 500 | 28 | 28 | 45 |
| C | 0.6 | 1.5 | 9.9 | 500 | 67 | 22 | 27 |
| D | 1.5 | 3.5 | 15.2 | 500 | 28 | 40 | 50 |
| E | 0.5 | 1.9 | 14.9 | 500 | 37 | 33 | 45 |
| F | 0.5 | 1.8 | 14.7 | 330 | 34 | 38 | 45 |
| G | 0.25 | 1.6 | 14.9 | 500 | 22 | 33 | 45 |
| H | 0.5 | 4.6 | 11.73 | 330 | 17 | 30 | 45 |

TABLE 2

Characteristics of Microbatteries Based on Interdigitated Electrodes

| | Low Rate | | High Rate | |
| --- | --- | --- | --- | --- |
| Battery | Energy (µWh/cm$^2$µm) | Power (µWh/cm$^2$µm) | Energy (µWh/cm$^2$µm) | Power (µWh/cm$^2$µm) |
| A | 15.0 | 22.9 | 0.01 | 5870 |
| B | 8.4 | 12.0 | 0.62 | 7360 |
| C | 10.9 | 4.7 | 0.08 | 4450 |
| D | 7.7 | 7.1 | 1.09 | 7260 |
| E | 4.7 | 4.6 | 0.19 | 4900 |
| F | 5.0 | 4.7 | 0.005 | 3920 |
| G | 2.9 | 2.7 | 0.39 | 2940 |
| H | 2.5 | 1.2 | 0.68 | 2420 |

Figure 9:
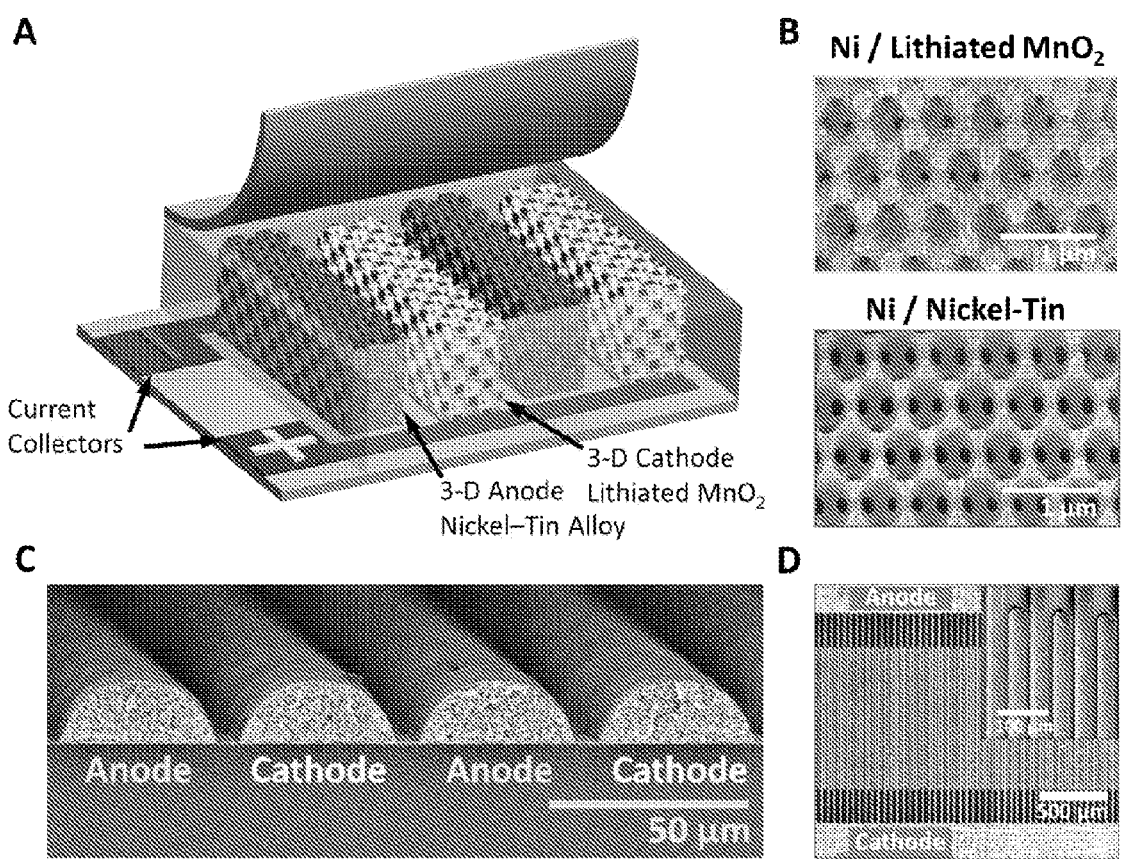
FIG. 9a shows a three dimensional rendering of an interdigitated microbattery architecture including an electrolytically active layer coated on an electrically conductive bicontinuous nickel scaffold, which acts as a current collector attached to an outside circuit.
FIG. 9b shows cross-sectional SEM images of the interdigitated electrodes of FIG. 9a, where the cathode is shown in the top image and the anode is shown in the bottom.
FIG. 9c shows a cross-sectional SEM image of the interdigitated electrodes spanning two periods.
FIG. 9d shows a top view SEM image of the interdigitated electrodes.
Figure 10:
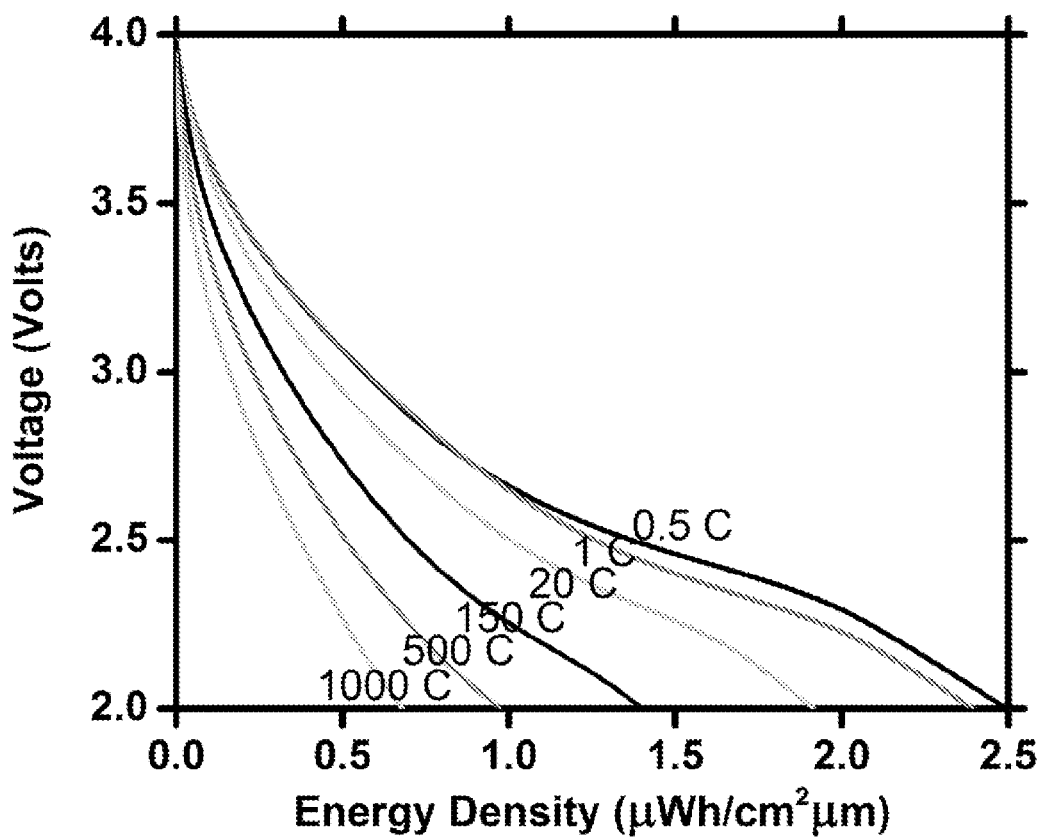
FIG. 10 shows a discharge curve of a fully integrated lithium ion microbattery cell with interdigitated porous 3D electrodes, where the cell is discharged at C rates ranging from 1 to 1000.

FIG. 9 shows discharge curves of the microbattery substrate at various C rates. The microbattery substrate was discharged from 4.0 to 2.0 volts. At a 0.5 C, rate the microbattery cell was discharged at a 0.25 µA current and achieved an energy and power density of 2.5 µWh/cm$^2$µm and 1.2 µW/cm$^2$µm. At a 20 C rate, the microbattery retained 77% of the 0.5 C energy and achieved a 48 µW/cm$^2$µm power density. The maximum power density was achieved at a 1000 C discharge rate. At 1000 C, the micro battery was discharged with a 500 µA current and achieved a 2400 µW/cm$^2$µm power density, while retaining 27% of the 0.5 C energy.

Table 3 below shows that the microbatteries based on the porous 3D electrodes of the present disclosure exhibit 2000 times higher power density and two times higher energy density than previous microbatteries that utilize 3D electrodes.

TABLE 3

Comparison of Previous Microbatteries with Microbatteries Based on Porous 3D Electrodes

| Battery | Chemistry | C-Rate | Electrode Height (µm) | Energy Density (µWh/cm$^2$µm) | Power Density (µW/cm$^2$µm) |
| --- | --- | --- | --- | --- | --- |
| MB1[1] | Carbon-PPYDBS | 2.1 | 65 | 0.33 | 2.77 |
| MB2[3] | MCMB-MoO$_y$S$_z$ | Low | 500 | 7.0 | 0.7 |
| MB2[3] | MCMB-MoO$_y$S$_z$ | High | 500 | 2.31 | 3.5 |
| MB3[4] | LiCoO$_2$—Li$_4$Mn$_5$O$_{12}$ | | 180 | 0.17 | 0.04 |
| MB4[2] | Ni—Zn | 16 | 200 | 0.01 | 0.17 |

TABLE 3-continued

Comparison of Previous Microbatteries with Microbatteries Based on Porous 3D Electrodes

| Battery | Chemistry | C-Rate | Electrode Height (µm) | Energy Density (µWh/cm$^2$µm) | Power Density (µW/cm$^2$µm) |
| --- | --- | --- | --- | --- | --- |
| A | NiSn - LMO* | 1.5 | 15 | 15 | 23 |
| B | NiSn - LMO* | 870 | 12.6 | 0.6 | 7,400 |

*LMO = Lithiated Manganese Oxide

Figure 11:
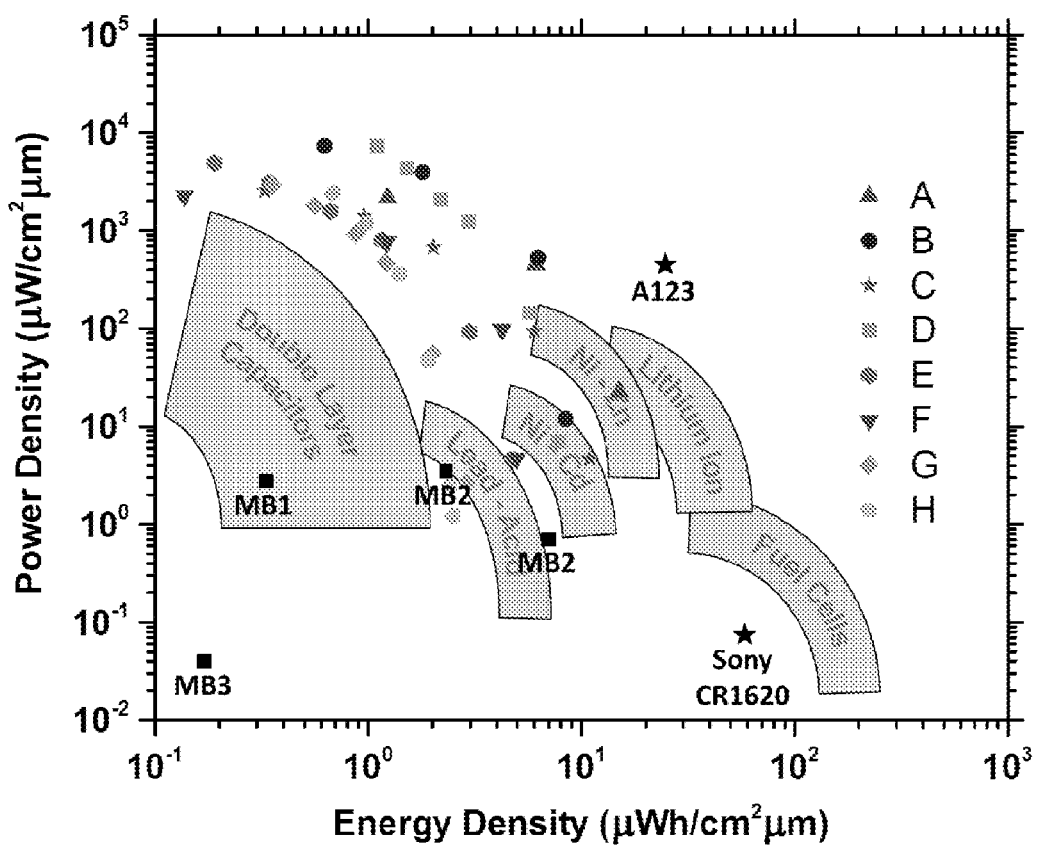
FIG. 11 is a Ragone plot of various energy storage technologies.

FIG. 11 is a Ragone plot of various energy storage technologies that shows that microbatteries based on porous 3D electrodes can even achieve greater power densities than supercapacitors while maintaining the energy density of conventional macroscale batteries. The energy and power density of the improved microbattery cells at various discharge rates are shown in A thru H. Previous microbattery cells with 3D electrodes are labeled MB1 thru MB3. For comparison, stars show commercial batteries from A123 (high power) and Sony (high energy). The shaded regions show energy and power density of typical macro scale energy storage technologies.

Figure 12:
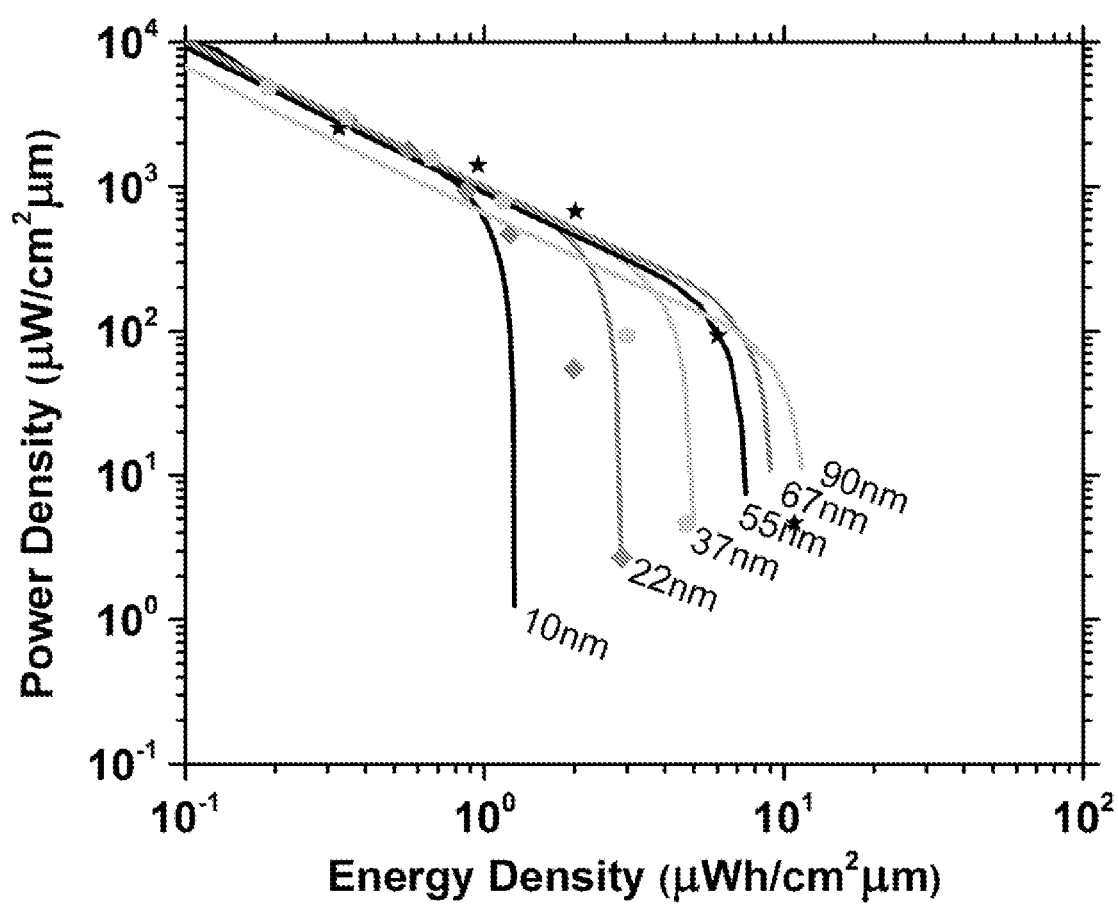
FIG. 12 is a Ragone plot showing the influence of active material thickness on energy and power density.
Figure 13:
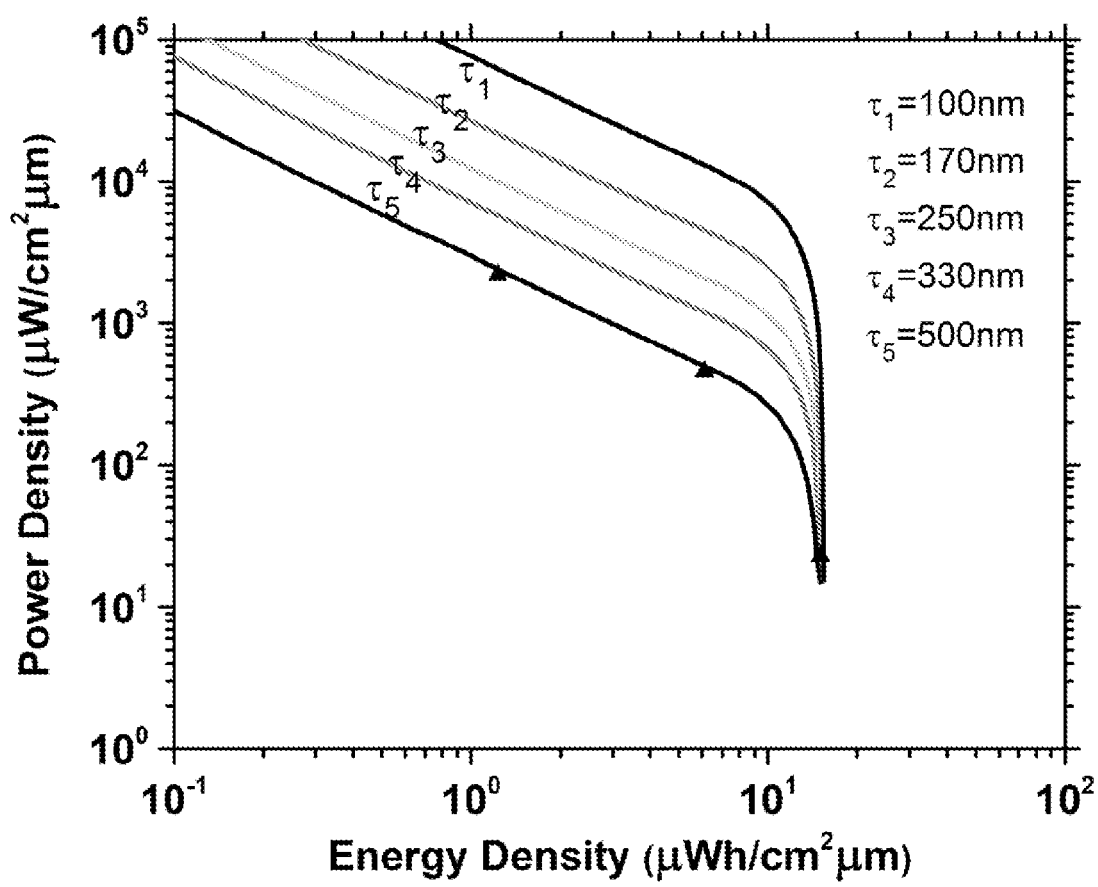
FIG. 13 is a Ragone plot showing the influence of scaffold pore diameter on energy and power density.

FIG. 12 is a Ragone plot showing the influence of active material thickness on energy and power density. The solid lines represent design simulations using 1-D spherical solid state diffusion of lithium with cathode material thickness varying from 10 nm to 90 nm. Experimental data for microbatteries G (diamond), E (pentagon), and C (star) are shown. FIG. 13 is a Ragone plot showing the influence of nickel scaffold pore diameter on energy and power density. The pore diameters are varied from 100 nm to 500 nm and the thickness of the cathode active material is varied such that the volume percentage of active material remains 40% for each pore diameter. The solid lines represent design simulations using 1-D spherical solid state diffusion of lithium. Experimental data for microbattery A (triangle) are shown. FIGS. 12 and 13 reveal that by adjusting the thickness of the active material and the diameter of the pores (voids), the energy and power density of the microbatteries can be tailored for specific applications.

Integrating 3D electrodes with a porous architecture into microbatteries has applications for supplying steady power with bursts of high, on-demand power, to portable electronics, autonomous sensors, MEMS, and implantable medical devices.

Although the present invention has been described with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein. Furthermore, the advantages described above are not necessarily the only advantages of the invention, and it is not necessarily expected that all of the described advantages will be achieved with every embodiment of the invention.

The invention claimed is:

1. A method of fabricating a three-dimensional porous electrode architecture for a microbattery, the method comprising:
    providing a surface comprising a first conductive pattern and a second conductive pattern thereon, the first and second conductive patterns being electrically isolated from each other;
    forming a lattice structure on the surface;
    infiltrating interstices of the lattice structure with a first conductive material and a second conductive material, the first and second conductive materials propagating through the interstices in a direction away from the surface to reach a predetermined thickness, where the first conductive material spans an area of the surface overlaid by the first conductive pattern and the second conductive material spans an area of the surface overlaid by the second conductive pattern;
    removing the lattice structure to form a network of interconnected voids in each of the first and second conductive materials, thereby forming three-dimensional first and second conductive scaffolds, each conductive scaffold having the predetermined thickness and a lateral size and shape defined by the respective conductive pattern;
    conformally depositing an anode active material on the second conductive scaffold to form a porous anode; and
    after depositing the anode active material, conformally depositing a cathode active material on the first conductive scaffold to form a porous cathode, and
    lithiating the porous cathode,
    thereby forming a three-dimensional battery electrode architecture.

2. The method of claim 1, wherein the cathode active material is MnOOH and the anode active material is selected from the group consisting of C, Li, Si, $SnO_2$, and a Ni—Sn alloy.

3. The method of claim 2, wherein the first conductive scaffold is covered with a removable protective layer prior to conformally depositing the anode active material.

4. The method of claim 1, wherein at least one of the first conductive scaffold and the second conductive scaffold is covered with a removable protective layer prior to conformal deposition of one of the cathode active material and the anode active material.

5. The method of claim 4, wherein the removable protective layer comprises a polymer selected from the group consisting of photoresist and polyacrylonitrile.

6. The method of claim 1, wherein the porous anode and the porous cathode are spaced apart on the substrate by a separation distance of about 60 microns or less.

7. The method of claim 1, where each of the first and second conductive pattern has a maximum lateral dimension of between about 5 microns and about 500 microns.

8. A method of fabricating a three-dimensional porous electrode architecture for a microbattery, the method comprising:
    providing a surface comprising a first conductive pattern and a second conductive pattern thereon, the first and second conductive patterns being electrically isolated from each other;
    forming a lattice structure on the surface;
    infiltrating interstices of the lattice structure with a first conductive material and a second conductive material, the first and second conductive materials propagating through the interstices in a direction away from the surface to reach a predetermined thickness, where the first conductive material spans an area of the surface overlaid by the first conductive pattern and the second conductive material spans an area of the surface overlaid by the second conductive pattern;
    removing the lattice structure to form a network of interconnected voids in each of the first and second conductive materials, thereby forming three-dimensional first and second conductive scaffolds, each conductive scaffold having the predetermined thickness and a lateral size and shape defined by the respective conductive pattern;
    conformally depositing an anode active material on the second conductive scaffold to form a porous anode; and
    conformally depositing a cathode active material on the first conductive scaffold to form a porous cathode, thereby forming a three-dimensional battery electrode architecture,
    wherein, after removing the lattice structure and prior to conformally depositing one of the cathode active material and the anode active material, a removable protective layer is applied to at least one of the first conductive scaffold and the second conductive scaffold.

9. The method of claim 8, wherein the removable protective layer comprises a polymer selected from the group consisting of photoresist and polyacrylonitrile.

10. The method of claim 8, wherein the anode active material is conformally deposited before the cathode active material is conformally deposited.

11. The method of claim 10, wherein, prior to conformally depositing the anode active material, the removable protective layer is applied to the first conductive scaffold.

12. The method of claim 10, wherein the cathode active material is MnOOH and the anode active material is selected from the group consisting of C, Li, Si, $SnO_2$, and a Ni—Sn alloy.

13. The method of claim 8, wherein the cathode active material is conformally deposited before the anode active material is conformally deposited.

14. The method of claim 13, wherein, after conformally depositing the cathode active material and prior to conformally depositing the anode active material, the removable protective layer is applied to the first conductive scaffold, the removable protective layer thereby covering the porous cathode.

15. The method of claim 13, wherein the cathode active material is selected from NiOOH and $MnO_2$ and the anode is Zn.

16. The method of claim 13, wherein, prior to conformally depositing the cathode active material, the second conductive scaffold is covered with a removable protective layer.

17. The method of claim 16, further comprising, after conformally depositing the cathode active material and before conformally depositing the anode active material:

removing the removable protective layer from the second conductive scaffold, and covering the porous cathode with a removable protective coating.

18. The method of claim 17, wherein the cathode active material is MnOOH and the anode active material is selected from Si and $SnO_2$.

19. The method of claim 8, wherein the porous anode and the porous cathode are spaced apart on the substrate by a separation distance of about 60 microns or less.

20. The method of claim 8, where each of the first and second conductive patterns has a maximum lateral dimension of between about 5 microns and about 500 microns.

* * * * *